US009846294B2

United States Patent
Deiwiks et al.

(10) Patent No.: US 9,846,294 B2
(45) Date of Patent: Dec. 19, 2017

(54) ADJUSTMENT SYSTEM FOR ALIGNING OPTICAL ELEMENTS OR SAMPLES IN VACUUM

(71) Applicant: FMB FEINWERK- UND MESSTECHNIK GmbH, Berlin (DE)

(72) Inventors: Jochen Deiwiks, Panketal (DE); Frieder Muller, Erkner (DE); Hans Henninger, Panketal (DE)

(73) Assignee: FMB FEINWERK-UND MESSTECHNIK GMBH, Berlin (DE)

( * ) Notice: Subject to any disclaimer, the term of this patent is extended or adjusted under 35 U.S.C. 154(b) by 0 days.

(21) Appl. No.: 15/509,681

(22) PCT Filed: Sep. 23, 2014

(86) PCT No.: PCT/IB2014/001905
§ 371 (c)(1),
(2) Date: Mar. 8, 2017

(87) PCT Pub. No.: WO2016/046583
PCT Pub. Date: Mar. 31, 2016

(65) Prior Publication Data
US 2017/0285298 A1    Oct. 5, 2017

(51) Int. Cl.
G02B 7/182    (2006.01)
(52) U.S. Cl.
CPC .................. *G02B 7/1827* (2013.01)
(58) Field of Classification Search
CPC ........................ G03F 7/70825; G02B 7/1827
(Continued)

(56) References Cited

U.S. PATENT DOCUMENTS

| 7,642,523 B1 | 1/2010 | Devitt |
| 2013/0114157 A1* | 5/2013 | Deyhim ................. G02B 7/182 |
| | | 359/872 |
| 2014/0176931 A1* | 6/2014 | Phillips .............. G02B 26/0816 |
| | | 355/67 |

FOREIGN PATENT DOCUMENTS

| DE | 10042802 C2 | 8/2002 | |
| JP | 04157399 A * | 5/1992 | ......... G03F 7/70075 |
| JP | H04157399 A | 5/1992 | |

OTHER PUBLICATIONS

International Search Report for App. No. PCT/IB2014/001905 dated May 20, 2015.

(Continued)

*Primary Examiner* — Bumsuk Won
*Assistant Examiner* — Collin X Beatty
(74) *Attorney, Agent, or Firm* — Walker & Jocke (57) ABSTRACT

The invention concerns an adjustment system for aligning optical elements and/or samples in vacuum (3) for projecting electromagnetic radiation in the terahertz range up to the range of hard X-ray radiation, consisting of at least one vacuum chamber (3"), at least one mirror (3') adjustable in spatial direction and/or at least one optical element adjustable in spatial direction or at least one sample adjustable in spatial direction, with translational actuators (X1, X2, Z1, Z2, Z3) in the undeflected state (idle state) being provided for adjusting the alignment of the at least one mirror (3') adjustable in spatial direction and/or the at least one optical element adjustable in spatial direction or the at least one sample adjustable in spatial direction in a maximum of three essentially mutually perpendicular spatial directions (X, Y, Z, y, y, z).
Pursuant to the invention it is provided that the at least one mirror (3') adjustable in spatial direction (X, Y, Z, y, y, z) and/or the at least one optical element adjustable in spatial (Continued)

direction (X, Y, Z, y, y, z) or sample within the vacuum chamber (3") is mounted in a fixed position in relation to the vacuum chamber (3"), with the vacuum chamber (3") being directly or indirectly connected with the translational actuators (X1, X2, Z1, Z2, Z3) for aligning the spatial position of the mirror and/or the optical element or the sample.

This setup facilitates a very compact and small design of the vacuum chamber and achieves a very high precision of the alignment.

9 Claims, 4 Drawing Sheets (58) Field of Classification Search
USPC .................................................. 359/872, 876
See application file for complete search history.

(56) References Cited

OTHER PUBLICATIONS

Pennwell Corp., Novel Vacuum Chamber Moves with the Wafer, Solid State Techonolohy, vol. 48 No. 8, Aug. 1, 007, p. 32, 34, XP001503715, ISSN: 0038-111X.

* cited by examiner

ADJUSTMENT SYSTEM FOR ALIGNING OPTICAL ELEMENTS OR SAMPLES IN VACUUM

The invention relates to an adjustment system for aligning optical elements (mirrors, gratings, crystals, lenses) or samples in vacuum consisting of at least one vacuum chamber, at least one optical element adjustable in spatial direction and/or one sample adjustable in spatial direction, with translational actuators in the undeflected state (idle state) being provided for adjusting the alignment of the at least one optical element adjustable in spatial direction and/or of the at least one sample adjustable in spatial direction in a maximum of three spatial directions which are essentially perpendicular to one another.

The position accuracy ("precision") of the illumination required for the ideal projection of electromagnetic radiation in the terahertz radiation range up to the range of hard X-ray radiation onto an object or onto an optical element is of very high significance. In order to direct the radiation via an optical element or even via several subsequent optical elements to the correct place it is therefore necessary to move optical elements or samples reproducibly by fractions of an arcsecond in the rotation's three degrees of freedom but also by a few nanometers in the translation's three degrees of freedom. In order to achieve such a precision it is not only necessary that the provided equipment is free from external vibrations, such as minimal seismic vibrations caused by vehicles passing by in the vicinity, or from natural vibrations of buildings induced by a changing wind load. Moreover it is also necessary that the equipment provided for precision alignment is free from internal mechanical stress which could lead to a hardly predictable misalignment of the precision alignment caused by thermal load during operation. Finally it is necessary that the equipment avoids mechanic eigenfrequencies within or below the internationally common mains frequencies of 50 Hz or 60 Hz and that it is also free from harmonics which can be induced by the aforementioned frequencies.

Several concepts are known for the precision alignment of optical elements and/or samples in a vacuum chamber which is evacuated and connected with the radiation source. In order to keep the equipment as free as possible from low-frequency eigenfrequencies, meaning from natural vibrations in the range of up to 50 Hz or 60 Hz or any corresponding harmonics, the drives (actuators) and the connecting elements between mirror and actuator are kept as short as possible, so as to avoid eigenmodes at low frequencies.

In order to facilitate the precision alignment in the three translational degrees of freedom, it is known as serial kinematics to combine motorized sliding platforms or motorized slides allowing the mirror and/or the optical element and/or the sample to move in mutually perpendicular spatial directions. With serial kinematics each degree of freedom is assigned to exactly one actuator.

Serial kinematics provides the very big benefit of a very simple control, since in serial kinematics the actuators' effects will accumulate in the manner of vector addition. In order to facilitate the up to six degrees of freedom of the spatial alignment, combinations of rotational and translational drives are used. However, with each combination of different drives a mechanic backlash is inevitable.

The very big disadvantage of serial kinematics relating to the purpose described herein is that with each combination of different alignment mechanisms their alignment tolerances sum up in the best case, which in the extreme case are exposed to the above mentioned resonance or thermal misalignment. Finally it is also possible that the mechanic backlash results in a static indeterminacy in the order of the tolerance of the mirror to be aligned.

The so-called Stewart/Gough/Cappell platform, frequently described as a "hexapod" in technical terminology, is a mechanism known since the 1950s for precision alignment in six degrees of freedom. In this parallel-kinematics mechanism six legs are connected as linear drives or hydraulics in the form of three triangles arranged around a circle and each consisting of two linear drives/hydraulics. The three tips of the three triangles meet on a second circular path so that the six legs form a total of six triangles, namely three triangles standing on the base plate and three triangles standing on their tips between the triangles standing on the base plate. Through a change of the relative spatial position of both circular paths in any combination of the six degrees of freedom towards one another the lengths of the six legs are definitely determined.

The benefit of parallel kinematics is the possibility of compensating any tolerance-induced guidance errors of one actuator by the other actuators. However, this also means that the position of the two circles in a parallel-kinematics hexapod is mechanically over determined, since the changes in length of all legs overlap in spatial terms, or in other words: The changes in lengths of the six legs among one another cannot be performed independently, because the six legs are not perpendicularly aligned to one another. The control equipment required for a parallel-kinematics mechanism partly requires highly complex calculation algorithms in order to calculate the mutual dependence of the actuators.

Findings from analytical geometry provide the certainty that a change in position of an object in six degrees of freedom is incompatible with six mutually independent changes in length. Therefore it is not possible to implement six degrees of freedom with any number of mutually orthogonal translation movements. This impossibility is based on the conclusion that while the translation in mutually perpendicular spatial directions commutate, this is not the case for the rotation around mutually perpendicular spatial directions. Therefore the sequence of movements of otherwise identical movements determines the result of a spatial change in position.

In order to align an optical element and/or sample with the help of a hexapod for the illumination with electromagnetic radiation in the energy range relevant to the invention with the aforementioned auxiliary conditions (including, without limitation, resonance poverty), it is therefore necessary to keep the six legs very short in relation to the circle's diameter of the triangles arranged in a circle. The consequence is a very strong overlapping of the individual legs' movements, which means that the movement control has to provide very complex calculation algorithms for the parallel control of the six legs. The change in lengths of each leg is associated with a parasitic change in length of almost the same magnitude in at least one adjacent leg, resulting in the necessity to calculate the dependence of the individual changes in position of the five other legs for movement control. Another hardly advantageous property of the hexapod for the purpose described herein is the distribution of the reproducibly achievable positions in space. The spatial resolution of the achievable positions of a hexapod is a non-linear transformation in relation to the reproducible resolution of the leg lengths of the six legs. The reproducibly achievable translational positions are not evenly distributed in space, but are distributed in space in a highly non-linear manner. Still another aspect has to be taken into consideration, namely, that the required precision of the change in the legs' lengths for the purpose described herein is so high, that in different hexapod positions the changes in length of two or more corresponding legs cannot be aligned without very high mechanical stress. This mutually opposing mechanical stress can increase with thermal load thus decreasing the required precision of the alignment.

It would be desirable to combine the benefits of serial kinematics, where each degree of freedom is exactly assigned to one actuator, with the benefits of parallel kinematics, where each actuator acts on the position of the spatially adjustable element.

A first approach for this purpose is disclosed in the German patent DE 100 42 802 C2. This publication informs on a system for the precision alignment of mirrors for synchrotron beams where three mutually perpendicular linear drives directly act on the mirror. The three mutually perpendicular linear drives are arranged in the Cartesian axes and have the Cartesian origin as their joint point of intersection. Two of the mutually perpendicular linear drives are paired with at least one linear drive arranged in parallel to them, in order to create the static determinacy, but also to perform rotations. This mechanism makes it possible to perform almost any combination of movements in six degrees of freedom with the movement of one single drive or with the paired movement of two linear drives in a very tight range around the point of rest. With each translational movement two other linear drives are subject to a shear movement which has to be compensated by joints and a certain, albeit, very small length variation. However, due to the very closely spaced linear drives very little parasitic motion (in transverse direction to the direction of a linear drive) suffice, in order to charge this setup with a very high mechanical stress. This mechanical stress can be transferred to the mirror, which thus might exhibit stress-induced dichroic properties and possibly forces the reflected radiation into an unwanted change in polarisation. Moreover it is necessary to lead the actuators out of a required vacuum chamber using joint rods and vacuum-proof bellows, which significantly reduces the resonance immunity of the whole setup; or the mechanic actuators have to be arranged within the vacuum chamber, which might result in a big effort and cause problems with a view to the quality of the vacuum.

The aim of the present invention is to increase the precision, reproducibility and life-time of equipment for the precision alignment of optical elements and/or samples.

The aim pursuant to the present invention is achieved by firmly fixing the at least one mirror adjustable in spatial direction and/or the at least one optical element adjustable in spatial direction and/or the sample within the vacuum chamber in relation to the vacuum chamber, with the vacuum chamber being indirectly or directly connected with the translational actuators for aligning the spatial position of the mirror and/or the optical element or the sample.

The invention therefore provides that the mirror and/or the optical element and/or the sample within the vacuum chamber are arranged in a fixed position in relation to the vacuum chamber. "Fixed position" within the framework of this application shall mean that the spatial orientation of the optical element and/or the sample does not change in relation to the spatial orientation of the vacuum chamber. For changing the spatial orientation of the optical element and/or sample in relation to the electromagnetic radiation in the terahertz range up to the range of hard X-ray radiation these are jointly aligned together with the vacuum chamber. On the one side the vacuum chamber, which encloses the mirror, the optical element and/or the sample and protects them from air, is connected with the radiation source; and on the other side the vacuum chamber is connected with the target, if it is a mirror and/or an optical element in the vacuum chamber. The connection is made flexibly in the form of metallic and vacuum-tight bellows. Since both the external enclosure of the vacuum chamber and the mirror and/or the optical element and/or the sample present in the vacuum chamber has to be evenly and precisely aligned, it is therefore necessary that the actuators act from the outside on the vacuum chamber. On the one hand it initially seems problematic, if an enclosure together with its interior components has to be precisely aligned. Due to the large contact surface of the vacuum chamber this type of alignment seems to be very sensitive to external influences. On the other hand, however, this setup facilitates a very small and compact design of the vacuum chamber, which in other systems using complex mechanisms for moving the mirror and/or the optical element and/or the sample is comparatively big, thus exhibiting undesirably large resonance surfaces.

In addition, the assembly described herein facilitates an extremely precise alignment, because the actuators act remotely and with quite a big lever towards the centre of gravity or centre point or the active point of the mirror and/or the optical element and/or the sample. If the actuators, for example, have a lower positioning limit of less than 20 nm per step, with a lever of about 20 cm an angular resolution of ArcSin (20 nm/20 cm) approx. 0.02" (arcsecond) is possible, which means that for a distance of 20 m between mirror or optical element to the target a spatial resolution of 2 µm is possible.

Over the known solution, where the actuators act directly on the mirror, this setup provides the big benefit that the vacuum chamber has no elements within the vacuum chamber affecting the vacuum quality, that fewer feedthroughs which might be sensitive to resonance vibrations are present, and that a precision alignment is possible which has hardly been achieved so far, simultaneously providing a very small tolerance of the spatial alignment.

Another advantageous aspect of this setup is, that the actuators themselves can be mounted directly on a massive block of a material with high internal damping of low frequencies in the range of less than 100 Hz, such as mineral material, like granite, synthetic granite or concrete or of metal. This setup in connection with a short actuator length facilitates a high resistance towards resonance vibrations.

In order to ensure the absence of any mechanical backlash, as required for achieving such a high precision, pursuant to the embodiment of the invention it is intended that the translational actuators are connected with the vacuum chamber via flexures. The flexures are preferably gimbal flexures which are present to compensate very little parasitic motion and which ensure a very high stiffness of the whole setup.

In a favourable way the actuators have a coupling rod with two gimbal flexures each, via which the actuators are mechanically connected with the vacuum chamber. The two gimbal flexures in the coupling rods facilitate the compensation of parasitic motion to the extent of the strokes required here for adjusting the optical element or the sample.

As an embodiment of the invention it is intended that for a first translational and a first rotational alignment a first pair of two translational actuators is provided, which in undeflected state (idle state) are essentially parallel to each other, and for a second translational and a second rotational alignment a second pair of two further translational actuators is provided, which in undeflected state (idle state) are essentially parallel to each other, with the spatial direction of the first pair in relation to the spatial direction of the second pair in the undeflected state (idle state) being essentially perpendicular to each other; and for a third rotational alignment another translational actuator is provided, whose spatial direction in the undeflected state (idle state) essentially is parallel to the spatial direction of the first or the second pair, with the axes of a maximum of two actuators forming a joint point of intersection. As aforementioned the terms of "parallel" and "perpendicular" refer to the stroke axes of the actuators.

Unlike as provided by the state of the art, the translational actuators for the three translational degrees of freedom do not act on the object to be adjusted in such a way that the three form a joint point of intersection, but it is provided that the actuators act on the corners of an imaginary cuboid, whose volume holds the mirror and/or optical element and/or sample to be adjusted, though enclosed in the vacuum chamber. Two actuators, which are parallel in the undeflected state (idle state), act on the different corners of a joint first edge of the imaginary cuboid, with the stroke axes of the two parallel actuators running collinear with each one second and third edge of the cuboid. This action of two actuators repeats for another pair of actuators in perpendicular direction on the imaginary cuboid. By the action of two pairs of actuators, of which the actuators within the pair in the undeflected state (idle state) are aligned in parallel and between the two pairs in the undeflected state (idle state) are aligned perpendicularly to one another, the cuboid acted on is adjustable in two translational degrees of freedom and in two rotational degrees of freedom. For performing the translational movement one mutually parallel pair of actuators moves the imaginary cuboid by a concordant movement into the desired direction. For performing the rotational movement one mutually parallel pair of actuators moves the imaginary cuboid by a movement in opposite directions around the desired rotational axis. While it is possible to have a third pair of actuators, which are mutually parallel to each other and aligned perpendicularly towards the other actuators, act on the cuboid, such a pair would not be able any longer to act independently of the pairs of actuators already acting. Either a concordant movement leading to translation would collide with the rotational movement of another pair, or vice versa. The introduction of a third pair of actuators, which is parallel to each other and aligned perpendicularly to the already existing pairs of actuators would destroy the mutual independence of the actuators, at least in the vicinity of the undeflected state (idle state). The embodiment of the invention provides that for a third rotational alignment another translational actuator is provided, with its spatial direction in the undeflected state (idle state) running essentially parallel to the spatial direction of the first and second pair. Thus one actuator triplet and one actuator pair is provided in order to cover a total of five degrees of freedom. The actuator triplet is not completely mutually independent, but can be considered as almost independent within the limits around the undeflected state (idle state).

For the static determinacy in space it is advantageously intended that as a sixth element at least one coupling rod with one gimbal flexure at each end of the rod is provided, which is connected with one space-fixed point about in the middle of the flat projection, which is limited by the translational axes of the two pairs of actuators. The space-fixed point can be an anchor firmly connected with the fundament. As an alternative it is provided that the sixth element is to be designed as another translational actuator, if the sixth degree of freedom of longitudinal translation is required.

For a particularly high resolution it has proven to be advantageous that the actuators each consist of a spindle drive which is driven via a play-free gearbox with a motor and which transfers the position via the at least one flexure on the position of the vacuum chamber. By appropriately selecting the spindle pitch, the gear ratio of the gearbox and the rotational angle resolution of the motor, a resolution in the range of some nm per step can be implemented in the translational actuators.

The invention is explained in greater detail using the following figures.

FIG. 1' is a schematic diagram like FIG. 2, however with a laser as a radiation source.

FIG. 1" is a schematic diagram like FIG. 2, however with a roentgen (X-ray) source as a radiation source.

Figure 1:
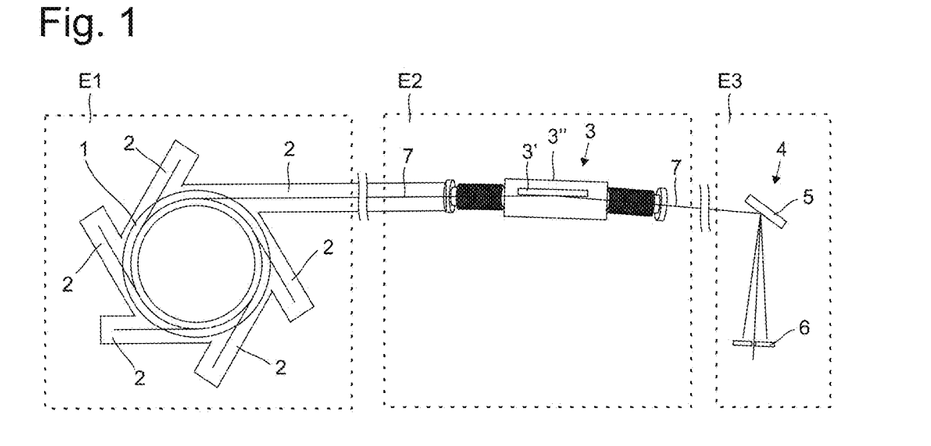
FIG. 1 is a schematic diagram showing an electromagnetic radiation source, here a synchrotron 1, the vacuum chamber pursuant to the present invention and a target, while the proportions of the three elements have been greatly modified for the sake of simplicity.

FIG. 1 shows a schematic diagram where an electromagnetic radiation source is described as the first element E1. The exit of the electromagnetic radiation source 2 is connected with the adjustment system 3 as the second element E2, which in the vacuum chamber 3" possesses an optical element 3' for projecting a virtual radiation source point onto a remote target 4 as the third element E3, here consisting of a grating 5 and an aperture 6. The vacuum chamber 3" pursuant to the present invention is very precisely and adjustably aligned for the very precise deflection and projection of the virtual radiation source point onto target 4. The aim of the invention is to design the alignment as simple as possible while simultaneously reducing the susceptibility to resonance and mechanical backlash and increasing the lifetime of the assembly. The adjustment system 3 together with the optical element from FIG. 1 is presented in FIG. 2 in detail.

Figure 2:
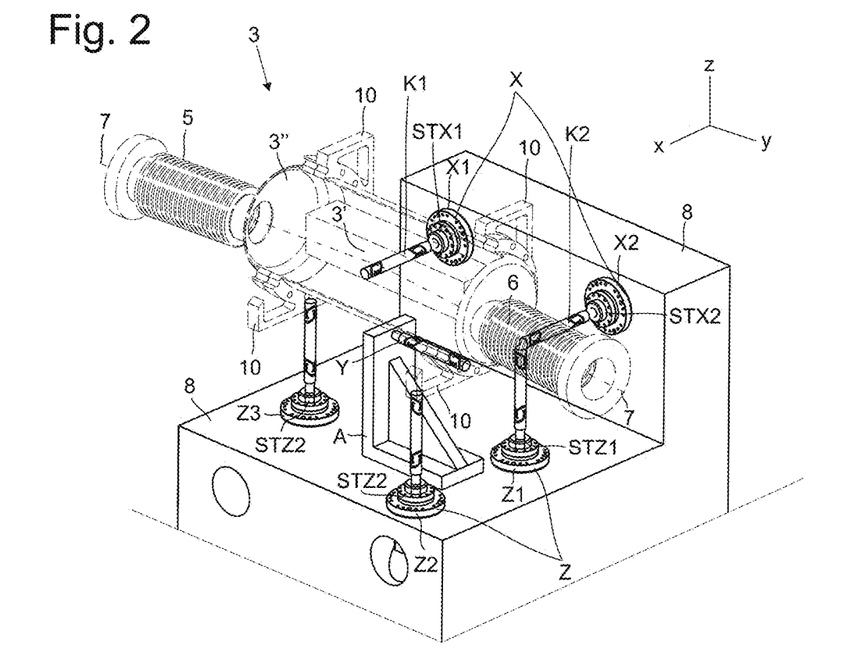
FIG. 2 is a vacuum chamber assembly with the vacuum chamber drawn in dotted lines, coupling rods and actuators in a fundament.

FIG. 2 shows one setup of the adjustment system pursuant to the present invention. The adjustment system 3 has one metallic bellows 11 and 12 at each end connecting the vacuum chamber 3" vacuum-tight on one side with the exit of an electromagnetic radiation source 1. On the other side the vacuum chamber is connected with the radiation target, in this present case with a grating/aperture assembly of a monochromator. An electromagnetic beam 7 with a very small opening angle hits mirror 3' present in the vacuum chamber 3" of adjustment system 3. In order to precisely align the electromagnetic beam 7, the whole vacuum chamber 3" is aligned using mutually parallel pairs of actuators X and Z. In the following the upper case letters of X, Y, Z refer to a translational movement in the direction of x, y, z, respectively, of a Cartesian coordinate system, and the lower case letters of x, y, z to a rotational movement around the axes x, y, z, respectively, of a Cartesian coordinate system.

A first pair of actuators X consists of the two mutually parallel actuators X1 and X2, with the two actuators themselves being firmly mounted as spindle drives STX1 and STX2 in a firm fundament 8 made of a material with high internal damping of low frequencies in the range of less than 100 Hz, such as mineral material, like granite, synthetic granite or concrete or of metal. Via coupling rods K1 and K2 the actuators X1 and X2 are connected with a cage 10, which itself is formed as a cuboid and which firmly embraces the vacuum chamber 3". The coupling rods K1 and K2 each have two gimbal flexures, which can absorb an undesired, but inevitable parasitic motion. The parasitic motion and their compensation by the coupling rods are explained in greater detail in FIG. 5.

As a second pair of actuators Z two actuators Z1 and Z2 are connected with the cuboid cage 10, with the actuators Z1 and Z2 being also mutually parallel; but these actuators Z1 and Z2 exhibit a perpendicular alignment to the actuators X1 and X2. All actuators X1, X2, Z1 and Z2 are independently adjustable in a small adjusting range around their undeflected state (idle state), without the readjustment of a first actuator necessarily causing the re-adjustment of a second actuator. Upon the deflection of one actuator the other actuators and their coupling rods have to compensate a possible parasitic motion. However, the system still is statically indetermined.

It would not be possible to add a third pair of actuators without having to sacrifice the independence of the actuators.

For a rotation around the indicated x-axis another single actuator Z3 is installed, which in the undeflected state (idle state) of all actuators is aligned in parallel to the second pair of actuators Z thus forming a triplet with them. This actuator Z3 is provided for adjusting a component less important for or less influencing the indicated beam path of the electromagnetic beam 7. If this actuator Z3 is moved alone, the alignment of the mirror 3' present in the vacuum chamber 3" is modified both by a rotation around the indicated x-axis and by a translation along the z-axis. For maintaining the independence between the rotation around the x-axis and the translation along the z-axis, the pair Z and the actuator Z3 have to be moved in opposite directions. However, this type of coupling still is acceptable as an easy to handle coupling, since the exactly opposing movement does not require complex arithmetic in the controller for controlling the actuators.

For the sixth degree of freedom, namely the translation along the y-axis, a coupling rod Y with two gimbal flexures is provided, which is also intended to accept the movements of the other five degrees of freedom. Since the translation along the y-axis, which essentially follows the slightly deflected beam path of the electromagnetic beam 7, in the example presented here of a vacuum chamber with mirror, has the least impact on the beam path of the electromagnetic beam 7, the coupling rod Y is firmly connected with fundament 8 via an anchor A thus as the last element offering a static determinacy in space ensuring the firm and immovable positioning of the adjustment system 3 in space.

Figure 3:
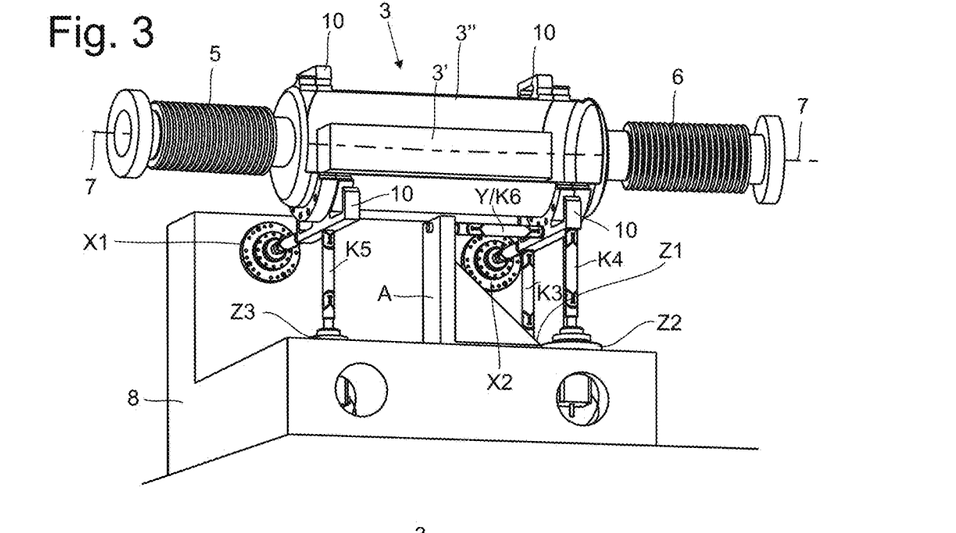
FIG. 3 is a perspective view from below of the vacuum chamber assembly from FIG. 2.

FIG. 3 shows the action of the three triplet-forming actuators Z1, Z2, and Z3 on the cuboid cage 10. Moreover it is illustrated how the coupling rod Y installed as a counter bearing acts on the cage 10 approximately between the two coupling rods Z1 and Z2 and is connected approximately below the mirror's centre of mirror 3' with an anchor A which itself is mounted on fundament 8.

Figure 4:
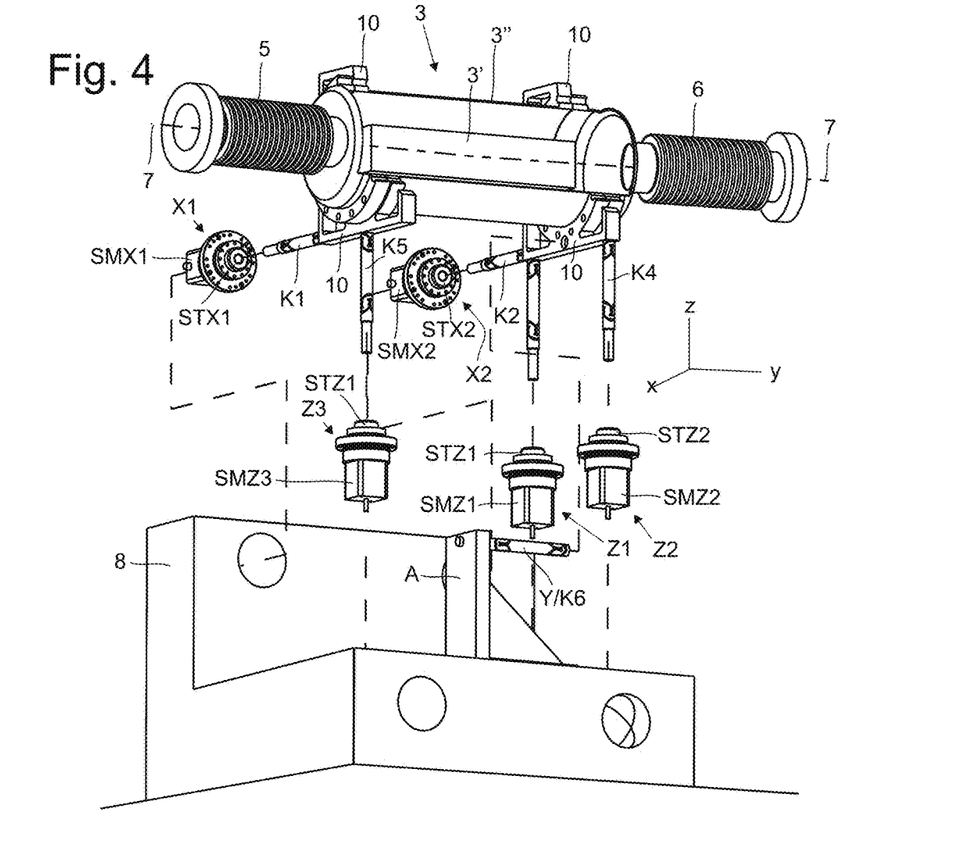
FIG. 4 is an exploded view of the vacuum chamber assembly from FIGS. 2 and 3.

For illustrating the setup of the whole assembly FIG. 4 outlines the adjustment system 3 pursuant to the present invention together with the vacuum chamber 3", the actuators X1, X2, Z1, Z2, Z3 as well as Y, the corresponding coupling rods K1, K2, K3, K4, K5, K6 and the cage 10 in an exploded view. The individual actuators X1, X2, Z1, Z2, Z3 are firmly mounted in corresponding borings in a fundament 8 which is forming an angle. The actuators themselves are driven by motors SMX1, SMX2, SMZ1, SMZ2, SMZ3. Via spindle drives with gearbox STX1, STX2, STZ1, STZ2, STZ3 they move the corresponding coupling rods K1, K2, K3, K4 and K5 and finally the connected cage 10 of the vacuum chamber 3". By the action of the actuators X1, X2, Z1, Z2, Z3 on the corners of the cuboid cage 10 the whole vacuum chamber 3" is shifted or rotated within the mechanical limits of the system, with the spatial alignment of mirror 3', whose position is fixed in relation to vacuum chamber 3", being moved together with vacuum chamber 3". The motions of the vacuum chamber are compensated by the metallic, vacuum-tight bellows 5 and 6, which are fitted with one flange on each side.

Figure 5:
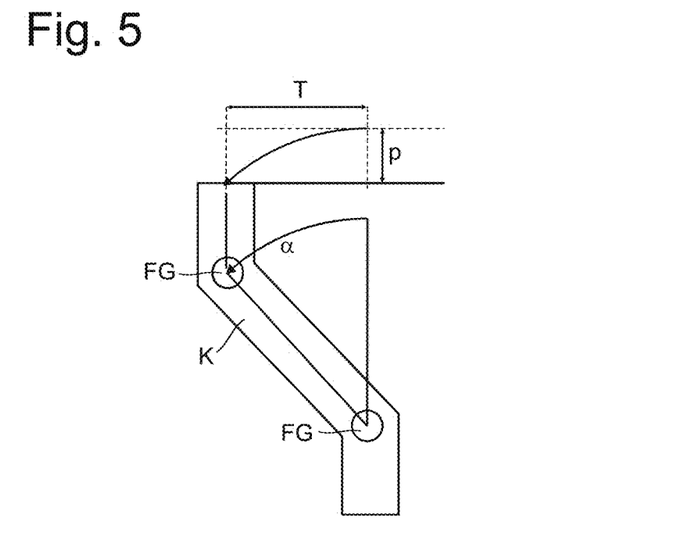
FIG. 5 is a schematic diagram for illustrating the parasitic motion.

For illustrating the parasitic motion FIG. 5 shows how a coupling rod K equipped with two gimbal flexures FG1 and FG2 in the undeflected state is subject to shear stress, exaggerated in this figure, exercised by a transversal stroke T. The coupling rod K reacts by deviating to the side around the transversal stroke T. Doing so, a parasitic motion at the end of the coupling rod has to be accepted. However, near the idle position the parasitic motion p is very small in relation to the transversal stroke T and in a first approximation is proportional to the difference of 1 minus the indicated angle α.

The bigger the distance between the two gimbal flexures FG1 and FG2, the smaller the angle α at the indicated transversal stroke T and the smaller the parasitic motion p upon a deflection along the transversal stroke T. However, for transversal strokes up to a maximum of 5 mm the distance of the gimbal flexures in the coupling rod K may amount to about 10 cm, without the parasitic motion too strongly influencing the deflections disturbed by the parasitic motion. In view of these proportions the parasitic motion is less than (1-95%) of the transversal stroke for a shearing action from the idle state. Given 5 mm for T as the maximum transversal stroke, the parasitic motion p is about 2.5 mm and is compensated by a movement on other actuators. However, if only small actuations of a few μm on the optical element/the sample are required, the parasitic motion becomes negligible, and therefore no compensating movement of the other actuators is required.

Figure 6:
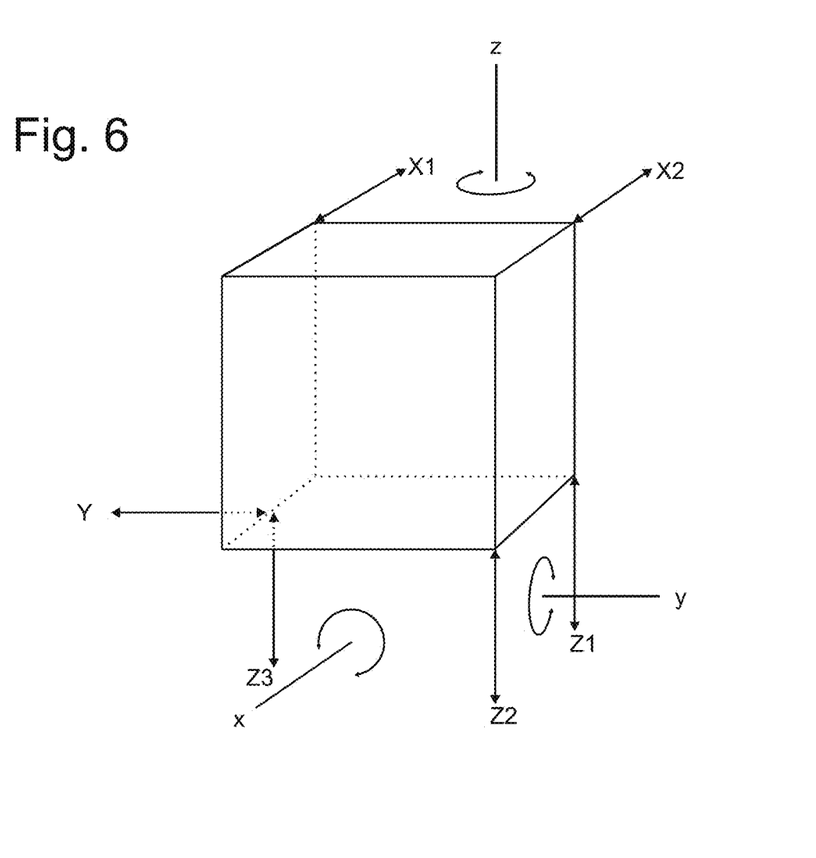
FIG. 6 is a schematic diagram for illustrating the action of the actuators.

FIG. 6 finally shows a schematic diagram of the actuators acting in the present invention, with the actuators exclusively shown as translational actuators. FIG. 6 should be read in connection with the below table.

| Translation/Rotation | X1 | X2 | Z1 | Z2 | Z3 | Y |
|---|---|---|---|---|---|---|
| Transl.-X | +1 | +1 | | | | |
| Transl.-Y | | | | | | (+1) |
| Transl.-Z | | | +1 | +1 | +1 | |
| Rot.-x | | | +1 | +1 | −1 | |
| Rot.-y | | | −1 | +1 | | |
| Rot.-z | −1 | +1 | | | | |

For a translational movement in X, Y, and Z directions it is necessary, for a movement in X direction (Transl.-X) it is necessary to move the actuators X1 and X2 in the same direction (both +1), for a movement in Y direction (Transl.-Y) it is necessary to move the actuator Y alone (+1), while this actuator would have only a very small impact on the beam path, for a movement in Z direction (Transl.-Z) it is necessary to move the actuators Z1, Z2 and Z3 in the same direction (all +1), for a rotation around x (Rot.-x) it is necessary to move the pair of actuators Z (consisting of actuator Z1 and Z2) in the same direction and actuator Z3 in the opposite direction, for a rotation around y (Rot.-y) it is necessary to move the pair of actuators Z (consisting of actuator Z1 and Z2) in opposite directions, and for a rotation around z (Rot.-z) it is necessary to move the pair of actuators X (consisting of actuator X1 and X2) in opposite directions.

LIST OF REFERENCE SIGNS

| | |
|---|---|
| 1 | Electromagnetic radiation source |
| 2 | Exit of the electromagnetic radiation source |
| 3 | Adjustment system |
| 3' | Mirror |
| 3" | Vacuum chamber |
| 4 | Target |
| 5 | Grating |
| 6 | Aperture |
| 7 | Beam |
| 8 | Fundament |
| 10 | Cage |
| A | Anchor |
| E1 | Element |
| E2 | Element |
| E3 | Element |
| FG1 | Flexure |
| FG2 | Flexure |
| K | Coupling rod |
| K1 | Coupling rod |
| K2 | Coupling rod |
| K3 | Coupling rod |
| K4 | Coupling rod |
| K5 | Coupling rod |
| K6 | Coupling rod |
| X | Pair of actuators |
| X1 | Actuator |
| X1' | Spindle drive |
| X2 | Actuator |
| X2' | Spindle drive |
| Y | Coupling rod |
| Z | Pair of actuators |
| Z1 | Actuator |
| Z2 | Actuator |
| Z3 | Actuator |
| S | Beam path |
| SMX1 | Motor |
| SMX2 | Motor |
| SMZ1 | Motor |
| SMZ2 | Motor |
| SMZ3 | Motor |
| STX1 | Spindle drive |
| STX2 | Spindle drive |
| STZ1 | Spindle drive |
| STZ2 | Spindle drive |
| STZ3 | Spindle drive |
| T | Transversal stroke |
| p | Parasitic motion |

The invention claimed is:

1. Adjustment system for aligning optical elements and samples in vacuum (3) for projecting optical or electromagnetic radiation, consisting of at least one vacuum chamber (3"), at least one mirror (3') adjustable in spatial direction, and/or of at least one optical element adjustable in spatial direction, and/or of at least one sample adjustable in spatial direction, where in the undeflected state (idle state) translational actuators (X1, X2, Z1, Y, Z2, Z3) are provided for adjusting the alignment of the at least one mirror (3') adjustable in spatial direction and/or of the at least one optical element adjustable in spatial direction or of the at least one sample adjustable in spatial direction in a maximum of three essentially mutually perpendicular spatial directions (X, Y, Z), characterized in that the at least one mirror (3') adjustable in spatial direction (X, Y, Z, x, y, z) and/or the at least one optical element adjustable in spatial direction (X, Y, Z, x, y, z) and/or sample within the vacuum chamber (3") are mounted in a fixed position in relation to the vacuum chamber (3"), with the vacuum chamber (3") being directly or indirectly connected with translational actuators (X1, X2, Z1, Z2, Z3) for aligning the spatial position of the mirror (3') and/or the optical element or the sample, whereby the translational actuators for the three translational degrees of freedom do not act on the object to be adjusted in such a way that the three form a joint point of intersection, but it is provided that actuators (X1, X2, Z1, Z2) act on the corners of an imaginary cuboid, whose volume holds the mirror (3') and/or optical element and/or sample to be adjusted, though enclosed in the vacuum chamber (3"), whereby for changing the spatial orientation of the mirror (3'), the optical element and/or sample in relation to the electromagnetic radiation these are jointly aligned together with the whole vacuum chamber, whereby actuators (X1, X2, Z1, Z2) act from the outside on the vacuum chamber.

2. Adjustment system for aligning optical elements and samples in vacuum according to claim 1, characterized in that the translational actuators (X1, X2, Z1, Z2, Z3) are connected via flexures (FG) with the vacuum chamber (3").

3. Adjustment system for aligning optical elements and samples in vacuum according to claim 2, characterized in that the translational actuators (X1, X2, Z1, Z2, Z3) have coupling rods (K1, K2, K3, K4, K5) with two gimbal flexures (FG) each and are connected via them with the vacuum chamber (3").

4. Adjustment system for aligning optical elements and samples in vacuum according to claim 3, characterized in that for a first translational (X) and a first rotational (z) alignment a first pair (X) of translational actuators (X1, X2) are provided which in the undeflected state (idle state) are essentially parallel to each another, and for a second translational (Z) and a second rotational (y) alignment a second pair (Z) of other translational actuators (Z1, Z2) are provided which in the undeflected state (idle state) are essentially parallel to each another, with the spatial direction of the first pair (X) towards the spatial direction of the second pair (Z) in the undeflected state (idle state) being essentially perpendicularly aligned, and for a third rotational alignment (x) another translational actuator (Z3) is provided, with its spatial direction in the undeflected state (idle state) being essentially parallel to the spatial direction second (Z) pair, and with the axes of a maximum of two actuators (X2, Z1) forming a joint point of intersection.

5. Adjustment system for aligning optical elements and samples in vacuum according to claim 4, characterized in that as a sixth element a translational actuator (Y) is provided, which is connected with one space-fixed point (A) approximately in the middle of the flat projection, which is limited by the translational axes of the two pairs of actuators (X, Z), with the spatial direction of the translational axis of this element in the undeflected state (idle state) being essentially aligned perpendicularly to the alignment of the two pairs of actuators (X, Z).

6. Adjustment system for aligning optical elements and samples in vacuum according to claim 5, characterized in that the mirror (3') or the optical element is arranged within the vacuum chamber (3") and is adjustable in the spatial direction together with the vacuum chamber (3").

7. Adjustment system for aligning optical elements and samples in vacuum according to claim 6, characterized in that the actuators (X1, X2, Z1, Z2, Z3) each consist of one spindle drive (STX1, STX2, STZ1, STZ2, STZ3) which is driven via a gearbox with a motor (SMX1, SMX2, SMZ1, SMZ2, SMZ3) and which transfers their positions via the at least one flexure (FG) each onto the position of the vacuum chamber (3").

8. Adjustment system for aligning optical elements and samples in vacuum according to claim 7, characterized in that the coupling rods (K1, K2, K3, K4, K5 and K6) with at least one flexure (FG) have a length of a maximum of 30 cm.

9. Adjustment system for aligning optical elements and samples in vacuum according to claim 8, characterized in that the actuators (X1, X2, Z1, Z2, Z3) are accommodated in a high-mass fundament (8) of between 100 kg and 3 t.

* * * * *